US 9,312,779 B2

(12) United States Patent
Liu et al.

(10) Patent No.: US 9,312,779 B2
(45) Date of Patent: *Apr. 12, 2016

(54) POSITION SENSORLESS OPEN LOOP CONTROL FOR MOTOR DRIVES WITH OUTPUT FILTER AND TRANSFORMER

(71) Applicant: Rockwell Automation Technologies, Inc., Mayfield Heights, OH (US)

(72) Inventors: Jingbo Liu, Grafton, WI (US); Thomas Nondahl, Greenfield, WI (US); Peter Schmidt, Franklin, WI (US); Semyon Royak, Orange Village, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/666,894

(22) Filed: Mar. 24, 2015

(65) Prior Publication Data
US 2015/0194901 A1 Jul. 9, 2015

Related U.S. Application Data

(63) Continuation of application No. 13/868,216, filed on Apr. 23, 2013, now Pat. No. 9,054,621.

(51) Int. Cl.
*H02P 13/00* (2006.01)
*H02M 5/44* (2006.01)
*H02P 21/00* (2006.01)
*H02P 27/06* (2006.01)
(Continued)

(52) U.S. Cl.
CPC .............. *H02M 5/44* (2013.01); *H02M 1/126* (2013.01); *H02P 21/0003* (2013.01); *H02P 23/0077* (2013.01); *H02P 27/06* (2013.01)

(58) Field of Classification Search
USPC ............... 318/801, 812, 400.01, 400.13, 805, 318/807, 813; 363/40, 41
See application file for complete search history.

(56) References Cited

U.S. PATENT DOCUMENTS

| 3,723,840 A | 3/1973 | Opal et al. |
| 4,823,251 A | 4/1989 | Kawabata et al. |
| 5,744,921 A | 4/1998 | Makaran |

(Continued)

FOREIGN PATENT DOCUMENTS

| CN | 2513286 Y | 9/2002 |
| CN | 201504207 U | 6/2010 |

(Continued)

OTHER PUBLICATIONS

"Guidelines for the Use of 400-600 Volt AC Drives in Medium Voltage Applications," Yaskawa Application Note, Jun. 7, 2005.

(Continued)

*Primary Examiner* — Eduardo Colon Santana
*Assistant Examiner* — Bickey Dhakal
(74) *Attorney, Agent, or Firm* — Fay Sharpe LLP

(57) ABSTRACT

A power converter, control apparatus and methods are presented for driving a permanent magnet motor or other load through a sine wave filter and a transformer, in which inverter output current is controlled using a current-frequency relationship to convert a desired frequency or speed value to a current setpoint, and the inverter output current is regulated to the current setpoint using a control algorithm with a bandwidth below the resonant frequency of the sine wave filter.

20 Claims, 3 Drawing Sheets

(51) Int. Cl.
H02M 1/12 (2006.01)
H02P 23/00 (2006.01)

(56) References Cited

U.S. PATENT DOCUMENTS

| | | | |
|---|---|---|---|
| 5,909,098 | A | 6/1999 | Konecny et al. |
| 5,959,431 | A | 9/1999 | Xiang |
| 5,994,869 | A | 11/1999 | Becerra |
| 6,121,736 | A | 9/2000 | Narazaki et al. |
| 6,124,697 | A | 9/2000 | Wilkerson |
| 6,208,537 | B1 * | 3/2001 | Skibinski et al. ............... 363/40 |
| 6,329,781 | B1 | 12/2001 | Matsui et al. |
| 6,940,249 | B2 | 9/2005 | Toyoda |
| 7,045,988 | B2 | 5/2006 | Ha et al. |
| 7,102,323 | B2 | 9/2006 | Zhou et al. |
| 7,679,308 | B2 | 3/2010 | Tomigashi |
| 7,724,549 | B2 | 5/2010 | Skibinski et al. |
| 7,729,146 | B2 | 6/2010 | Hayami et al. |
| 7,979,223 | B2 | 7/2011 | Monti et al. |
| 7,990,097 | B2 | 8/2011 | Cheng et al. |
| 8,009,450 | B2 | 8/2011 | Royak et al. |
| 8,288,886 | B2 | 10/2012 | Anwar et al. |
| 8,736,220 | B2 * | 5/2014 | Ogawa et al. ................. 318/801 |
| 2006/0113952 | A1 | 6/2006 | Zhou |
| 2007/0007929 | A1 | 1/2007 | Lee et al. |
| 2008/0074074 | A1 * | 3/2008 | Skibinski et al. ............. 318/800 |
| 2008/0312855 | A1 * | 12/2008 | Monti et al. ..................... 702/64 |
| 2009/0146592 | A1 | 6/2009 | Tobari et al. |
| 2011/0109155 | A1 * | 5/2011 | Anwar et al. .................. 307/9.1 |
| 2014/0197774 | A1 | 7/2014 | Liu et al. |
| 2014/0312811 | A1 | 10/2014 | Liu et al. |
| 2015/0002059 | A1 | 1/2015 | Liu et al. |
| 2015/0002067 | A1 | 1/2015 | Rowan et al. |

FOREIGN PATENT DOCUMENTS

| | | |
|---|---|---|
| CN | 101950983 A | 1/2011 |
| CN | 202872721 U | 4/2013 |
| EP | 1635448 A1 | 3/2006 |
| JP | 2001-025282 | 1/2001 |
| WO | WO2009093214 A2 | 7/2009 |

OTHER PUBLICATIONS

Agarlita, Sorin-Cristian et al., "I-f Starting and Active Flux Based Sensorless Vector Control of Reluctance Synchronous Motors, with Experiments", 12$^{th}$ Int'l Conf. on Optimization of Electrical and Electronic Equipment, OPTIM 2010, pp. 337-342.
Andreescu, G., et al. "Stable V/f Control System with Unity Power Factor for PMSM Drives", IEEE 13$^{th}$ Int'l Conf. on Optimization of Electrical and Electronic Equipment (OPTIM), May 2012, pp. 432-438.
Batzel, Todd D. et al., "*Electric Propulsion With Sensorless Permanent Magnet Synchronous Motor: Implementation and Performance*", IEEE Transactions on Energy Conversion, vol. 20, No. 3, pp. 575-583, Sep. 2005.
Colby, Roy S., "An Efficiency-Optimizing Permanent-Magnet Synchronous Motor Drive", IEEE Transactions on Industry Applications, vol. 24, No. 3, May/Jun. 1998, pp. 462-469.
Fatu et al., I-F Starting Method With Smooth Transition to EMF Based Motion-Sensorless Vector Control of PM Synchronous Motor/ Generator, 2008, IEEE, pp. 1481-1487.
Halkassari, Optimal U/F-Control of High Speed Permanent Magnet Motors, 2006, IEEE, pp. 2302-2308.
Iepure, Liviu Ioan et al., "Hybrid I-f Starting and Observer-Based Sensorless Control of Single-Phase BLDC-PM Motor Drives", IEEE Transactions on Industrial Electronics, vol. 59, No. 9, Sep. 2012, pp. 3436-3444.
J. Liu et al., "Rotor Position Estimation for Synchronous Machines Based on Equivalent EMF", IEEE Transactions on Industry Applications, vol. 47, pp. 1310-1318, May-Jun. 2011.

Jaitrong et al., "A Modify Technique to Actively Damp Oscillation in the Input LC Filter of Three-Phase PWM Rectifier", Electrical Engineering/Electronics, Computer, Telecommunications and Information Technology, 2008; Proceedings of ECTI-CON 2008; pp. 1017-1020.
Kiuchi, M., et al., "V/f Control of Permanent Magnet Synchronous Motors Suitable for Home Appliances by DC-link Peak Current Control Method", The Jun. 2010 Int'l Power Electronics Conference, IEEE 2010, pp. 567-573.
Kojima, Mari et al., "*Novel Vector Control System Using Deadbeat-Controlled PWM Inverter With Output LC Filter*", IEEE Transactions on Industry Applications. vol. 40, No. 1, pp. 162-169, Jan./Feb. 2004.
Kukrer, "Deadbeat Control of a Three-Phase Inverter with an Output LC Filter", IEEE Transactions on Power Electronics, vol. 11, No. 1, Jan. 1996, 8 pgs.
Laczynski et al., "Active Damping of LC-Filters for High Power Drives Using Synchronous Optimal Pulsewidth Modulation", Power Electronics Specialists Conf., IEEE, Jun. 15, 2008, pp. 1033-1040.
Loh, Poh Chiang et al., "*Analysis of Multiloop Control Strategies for LC/CL/LCL-Filtered Voltage-Source and Current-Source Inverters*", IEEE Transactions on Industry Applications, vol. 41, No. 2, pp. 644-654, Mar./Apr. 2005.
Makridenko, L.A. et al., "Sensorless Drive With Synchronous Machine and Submersible Inverter for Oil-Drowned Pump", IEEE European Conf. on Power Electronics and Applications (EPE), pp. 1-10, Sep. 2009.
Matsushita, M., et al., "Stabilization Control of Sensorless Sinusoidal Wave Drive for Control of Power Factor of PM Motor", IEEE Int'l Conf. Electrical Machines and Systems (ICEMS), 2009, 5 pgs.
Mukherjee et al., "Fast Control of Filter for Sensorless Vector Control SQIM Drive With Sinusoidal Motor Voltage", IEEE Transactions on Industrial Electronics, vol. 54, No. 5, Oct. 2007, pp. 2435-2442.
Nakamura, Yoshinobu et al., "High-Efficiency Drive Due to Power Factor Control of a Permanent Magnet Synchronous Motor", IEEE Transactions on Power Electronics, vol. 10, No. 2, Mar. 1995, Manuscript rec'd Aug. 22, 1992, revised Sep. 13, 1994, pp. 247-253.
Park et al., "Analysis and Reduction of Time Harmonic Rotor Loss in Solid-Rotor Synchronous Reluctance Drive", IEEE Transactions on Power Electronics, vol. 23, No. 2, Mar. 1, 2008, pp. 985-992.
Park et al., "Design and Control of High-Speed Solid-Rotor Synchronous Reluctance Drive With Three-Phase LC Filter", Conference Record of the 2005 IEEE Industry Applications Conf. 40$^{th}$ IAS Annual Meeting, vol. 1, Oct. 2, 2005, pp. 715-722.
Perera, P.D. Chandana, "A Sensorless, Stable V/f Control Method for Permanent-Magnet Synchronous Motor Drives", IEEE Transactions on Industry Applications, vol. 39, No. 3, May/Jun. 2003, IEEE 2003, pp. 783-791.
Ryvkin, S. et al., "Sensorless Oil Drowned Pump Drive", IEEE ISIE 2005, Jun. 20-23, 2005, Dubrovnik, Croatia, pp. 963-968.
Salomäki, J. et al., "*Sensorless Control of Induction Motor Drives Equipped With Inverter Output Filter*", IEEE Transactions on Industrial Electronics, vol. 53, No. 4, pp. 1188-1197, Aug. 2005.
Salomäki, J. et al., "*Sensorless Vector Control of PMSM Drives Equipped With Inverter Output Filter*", in Proceedings of the 32$^{nd}$ Annual Conference of the IEEE Industrial Electronics Society (IECON 2006), Paris, France, pp. 1059-1064.
Steinke et al., "Use of a LC Filter to Achieve a Motorfriendly Performance of the PWM Voltage Source Inverter", Electric Machines and Drives Conference Record, 1997; IEEE, Milwaukee, WI, May 18, 1997, 3 pgs.
Kim et al., "PWM Switching Frequency Signal Injection Sensorless Methods in IPMSM", IEEE, 2011, pp. 3021-3028.
Yaskawa Technical Review, vol. 69, No. 2, AC Drive Drive, Sensorless Drive Technology for Permanent Magnet Synchronous Motor; http://www.yaskawa.co.jp/en/technology/tech_news/69-2/t10.htm, retrieved from the Internet 11-26-2-14, 1 pg.
Kubota et al., "Sensorless Vector Control of Closed-Slot Induction Machines at Low Frequency", IEEJ Journal of Industry Applications, vol. 2, No. 1, The Institute of Electrical Engineers of Japan, 2013, pp. 74-78.

(56) References Cited

OTHER PUBLICATIONS

Kobayashi et al., "Investigation of IPMSM's Position Estimation in Low Speed Region with DC Link Current Detection", IEEE Jan. 2007, pp. 1411-1416.

Miranda et al., "Parameter and Speed Estimation for Implementing Low Speed Sensorless PMSM Drive System Based on an Algebraic Method"; Applied Power Electronics Conf.; APEC 2007, $22^{nd}$ Annual IEEE; Feb. 1, 2007,;pp. 1406-1410.

Miranda et al., "Sensorless Control of a PMSM Synchronous Motor at Low Speed"; IEEE Industrial Electronics; IECON 2006; $32^{nd}$ Annual Conf., IEEE; Piscataway, NJ; Nov. 1, 2006; pp. 5069-5074.

Yim et al., "A Predictive Current Control Associated to EKF for High Performance IPMSM Drives"; Applied Power Electronics Conf. and Exposition (APEC), 2011; $26^{th}$ Annual IEEE, Mar. 6, 2011; pp. 1010-1016.

Moldovan et al., "Active-Flux Based, V/f-With-Stabilizing-Loops Versus Sensorless Vector Control of IPMSM Drives"; Industrial Electronics (ISLE); 2011 IEEE Int'l Symposium; Jun. 27, 2011; pp. 514-519.

Stirban et al., "Motion-Sensorless Control of BLDC-PM Motor With Offline FEM-Information-Assisted Position and Speed Observer"; IEEE Transactions on Industry Applications; IEEE Service Center, Piscataway, NJ; vol. 48, No. 6; Nov. 1, 2012; pp. 1950-1958.

Carpaneto, et al., "A New Sensorless Permanent Magnet Synchronous Motor Algorithm Based on Algebraic Method"; $13^{th}$ European Conf. on Power Electronics and Applications, 2009; EPE 2009; Sep. 8-10, 2009, Barcelona, Spain; IEEE, Piscataway, NJ, Sep. 8, 2009, pp. 1-10.

\* cited by examiner

POSITION SENSORLESS OPEN LOOP CONTROL FOR MOTOR DRIVES WITH OUTPUT FILTER AND TRANSFORMER

REFERENCE TO RELATED APPLICATION

This application is a continuation of, and claims priority to and the benefit of, U.S. patent application Ser. No. 13/868,216, filed on Apr. 23, 2013, entitled POSITION SENSORLESS OPEN LOOP CONTROL FOR MOTOR DRIVES WITH OUTPUT FILTER AND TRANSFORMER, the entirety of which application is hereby incorporated by reference.

BACKGROUND

Sensorless motor drives have been used in a variety of applications, particularly where providing position and/or speed sensors directly at a motor load is difficult or impractical. A typical sensorless system employs a voltage-frequency (V/F), alternatively known as Volts per Hertz (V/Hz), controller providing a voltage setpoint according to a desired motor speed or frequency, and this form of sensorless control has been used primarily with induction motors. In certain applications, however, a step-up transformer is often needed to boost the motor drive output voltage. For instance, a transformer may allow a low-voltage drive to be used to power a medium voltage induction motor, and/or a step-up transformer can be used to reduce $I^2R$ losses and allow use of a smaller gauge cable wire for long cable runs between the motor drive and the driven motor. Certain applications also employ sine wave filters, such as LC filters to suppress reflected wave voltage spikes associated with pulse width modulated variable frequency drives. Use of voltage-frequency control techniques, however, may lead to problems, particularly where a transformer and/or sine wave filter is connected between the motor drive in the motor load. For example, voltage-frequency control loops often suffer from variations in uncontrolled drive current, even when the voltage command is constant. Also, saturation of the step-up transformer may lead to significantly increased drive current, without delivering much power to the motor load. Moreover, voltage-frequency control in combination with a sine wave filter under starting conditions may result in the motor not being able to start, with large oscillations on the rotor shaft for low frequency commands. Furthermore, conventional sensorless voltage-frequency drive control has not been largely successful in driving permanent magnet motors when output filters and transformers are employed. Thus, while sensorless control schemes are advantageous due to length of cable runs and avoidance of costs associated with providing feedback directly from the motor, further improvements are needed for sensorless motor drive control, particularly for driving permanent magnet motors.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides sensorless position control using current regulation and current-frequency and reduced bandwidth control concepts by which open loop power converter control is possible to avoid or mitigate the above-mentioned shortcomings of traditional voltage-frequency sensorless control. These techniques and apparatus find particular utility in association with sensorless motor drive applications involving sine wave output filters and step-up transformers to accommodate long cable runs between the drive and a driven motor, including induction motors and/or permanent magnet motors, such as in submersible pump applications and the like. Other applications are possible, in which the described control approaches may be used, including power converter operation to provide variable frequency AC output to any form of load.

A power conversion system is presented, which includes an inverter providing AC output power to drive a load, as well as a controller that regulates the inverter output current(s) in whole or in part according to a frequency or speed setpoint value via a control algorithm having a bandwidth below a resonant frequency of a filter coupled between the inverter and the load. In certain embodiments, the controller includes a current-frequency control component providing a current setpoint value at least partially according to the frequency or speed setpoint, as well as a current control regulator component implementing the control algorithm to regulate the inverter output current or currents at least partially according to the current setpoint value. In certain implementations, the current control regulator may be a proportional-integral (PI) controller with a control bandwidth below the resonant frequency of the output filter, and the control algorithm can be implemented to regulate the inverter output currents according to the current setpoint value and one or more feedback signals or values representing the inverter output current. Moreover, certain implementations of the controller include a rate limiter component operative to limit a rate of change of the received desired frequency or speed value to provide a rate-limited frequency or speed setpoint.

A power conversion system control method and computer-readable mediums with computer-executable instructions are provided in accordance with further aspects of the present disclosure, in which a current setpoint value is determined at least in part according to a frequency or speed setpoint value, and at least one AC output current feedback signal or value of the power conversion system is sampled. The method further includes regulating the output current according to the current setpoint value and the output current feedback using a control algorithm with a bandwidth below a resonant frequency of an output filter. In certain implementations, the method further includes limiting the rate of change of a desired frequency or speed value to determine the frequency or speed setpoint, and may also include determining the current setpoint value according to a current-frequency relationship with a zero current value corresponding to a zero frequency value. In certain implementations, for example, the current-frequency relationship may be a curve or parametric equation or lookup table or the like, including a first portion with increasing current values corresponding to a first frequency range from zero to a cutoff frequency, as well as a second portion having a constant current value, such as a maximum output current of the inverter, for frequencies above the cutoff frequency value.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
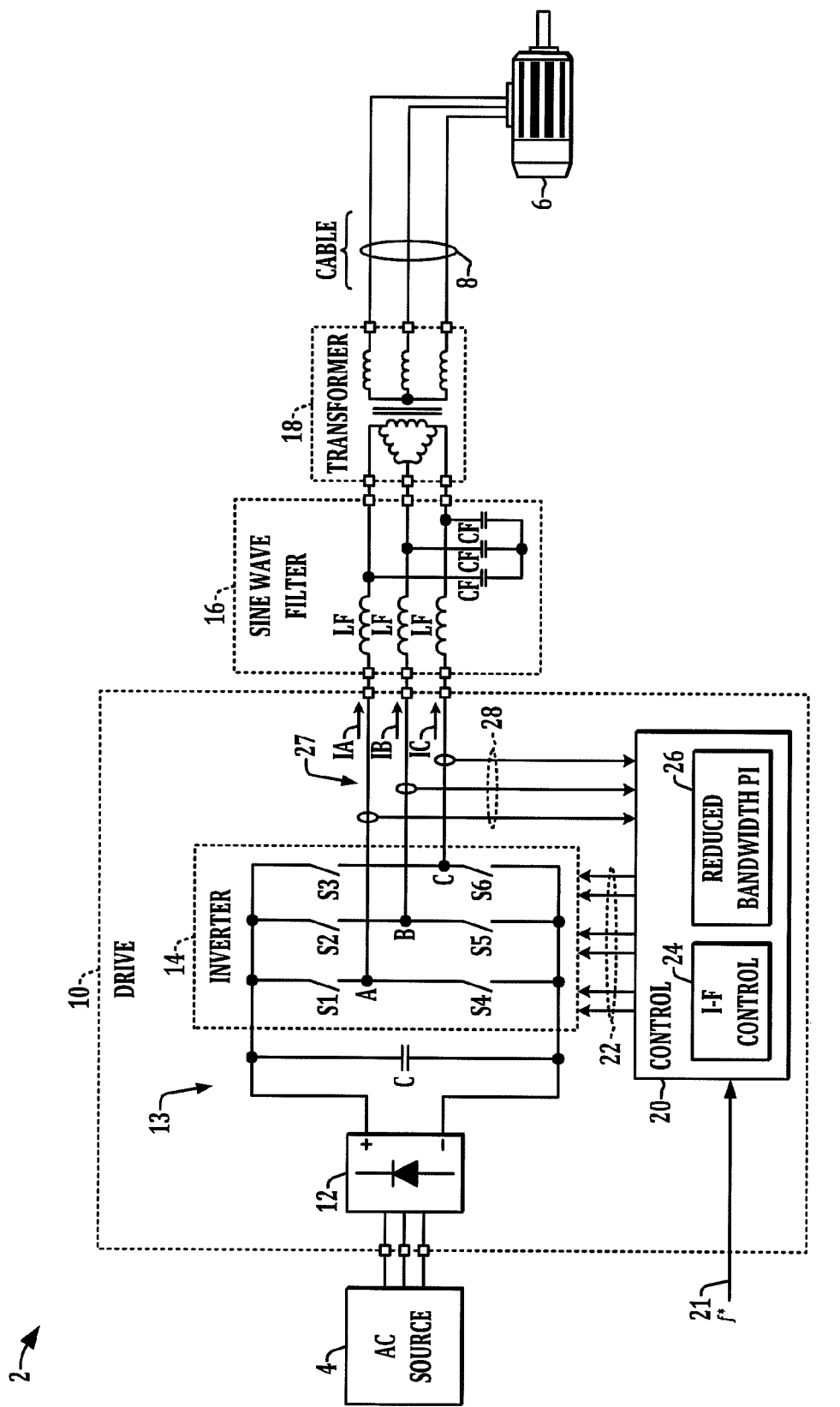
FIG. 1 is a schematic diagram illustrating an exemplary variable frequency drive type power conversion system providing AC output power through a sine wave filter and a step-up transformer and a cable to a driven permanent magnet motor load for submersible pump applications and the like, in which the motor drive inverter output stage is controlled using a current-frequency control component and a reduced bandwidth proportional-integral (PI) control component in accordance with one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale. The present disclosure provides methods and apparatus for driving an electric motor or other load through an output filter and optionally through an additional transformer, and finds utility in submersible pump situations or other applications where an AC load is powered without direct feedback from the driven load. For example, sensorless motor drive applications may be enhanced by use of the disclosed apparatus and methods, even for permanent magnet motor loads, while mitigating or avoiding unregulated drive output current, transformer saturation, and problems with motor starting seen in conventional voltage-frequency sensorless motor drive systems. Accordingly, the advantages of sensorless control can be facilitated, including reduced cost and system complexity, in combination with the use of sine wave filters and transformers to reduce the cost and size of cabling and to mitigate reflected wave problems, while still achieving enhanced control capabilities with respect to motor speed and/or position or other driven load performance parameters. Moreover, the concepts of the present disclosure do not require additional hardware, and thus present a low-cost solution to the above-mentioned problems associated with conventional voltage-frequency sensorless motor control schemes.

FIG. 1 illustrates an exemplary system 2 having an AC power source 4 providing three-phase AC input power (e.g., 480 V AC, 50 or 60 Hz) to a motor drive power conversion system 10. The motor drive 10, in turn, provides variable frequency, variable amplitude multiphase AC output power through a sine wave filter 16 and a connected transformer 18, and then through a cable 8 to drive a permanent magnet or induction motor load 6 as shown. In various applications, such as submersible pumps, a relatively lengthy cable 8 can be used, and the transformer 18 may be used in certain implementations as a step-up device to boost the voltage outputs provided by the motor drive 10 to a higher level to combat $I^2R$ losses along the length of the cable 8 and reduce the size of the cable 8, and/or to allow a relatively low voltage motor drive 10 to operate a higher voltage motor load 6. As seen in FIG. 1, the motor drive 10 includes a rectifier 12, which can be an active (e.g., switching) rectifier or a passive rectifier, full wave, half wave, etc., and which receives the AC input power from the source 4 and provides DC power to a bus or DC link circuit 13 having a capacitance C. While illustrated as a multiphase rectifier, the concepts of the present disclosure may be employed in single-phase input drives and power converters. An inverter 14 receives DC power from the bus circuit 13 and includes switching devices S1, S2, S3, S4, S5 and S6 operated according to inverter switching control signals 22 provided by a controller 20 in order to convert the DC power to AC output currents IA, IB and IC for driving the motor load 6. In the illustrated embodiment, the inverter 14 provides a three-phase output, but other multiphase and single-phase output implementations are possible within the scope of the present disclosure. Any suitable inverter switching devices S1-S6 may be used, including without limitation insulated gate bipolar transistors (IGBTs), silicon controlled rectifiers (SCRs), gate turn-off thyristors (GTOs), integrated gate commutated thyristors (IGCTs), etc.

The motor drive 10 also includes a controller 20 providing the inverter switching control signals 22 to the inverter switches S1-S6. The controller 20 and the elements and components thereof (e.g., further shown in FIG. 2 below) can include suitable logic or processor-based circuitry, and may also include signal level amplification and/or driver circuitry (not shown) to provide suitable drive voltage and/or current levels sufficient to selectively actuate the switching devices S1-S6, for instance, such as comparators, carrier wave generators or digital logic/processor elements and signal drivers. Moreover, the controller 20 can provide the switching control signals 22 according to any suitable pulse width modulation technique, including without limitation vector modulation (SVM) carrier-based pulse width modulation, selective harmonic elimination (SHE), etc.

The system 2 of FIG. 1 also includes a sine wave or output filter 16, in one example, a three-phase LC filter having a series filter inductor LF in each output line, as well as a corresponding filter capacitor CF coupled between the corresponding phase line and a common connection point. Other output filter topologies may be used, such as LCL filters, CLC filters, etc. with one or more series elements and further filter elements (e.g., filter capacitors CF) connected in any suitable delta or Y configuration. In addition, as shown in FIG. 1, a transformer 18 is provided between the filter 16 and the motor cable 8. In the illustrated example, the transformer 18 has a three phase delta-connected primary as well as a Y-connected secondary, although any suitable transformer primary and/or secondary winding configuration or topology may be used. Moreover, the transformer 18 may, but need not, be a step-up transformer. In certain applications, a step-up transformer 18 is advantageous, for example, to allow a low-voltage drive 10 to power a medium or high voltage motor 6, or to allow use of a medium-voltage drive 10 to power a high-voltage motor 6. Also or in combination, a step-up transformer 18 may be useful to allow a reduction in the current levels carried by the cable 8, thereby facilitating use of smaller diameter cable wires and a corresponding reduction in $I^2R$ losses in the cable 8. The cable 8, moreover, can be of any suitable construction for interfacing the motor drive output, the sine wave filter 16, and the transformer 18 with the leads of the motor 6.

The motor drive 10 and the controller 20 thereof, operate in sensorless fashion to control one or more operating parameters of the driven motor load 6. For example, the controller 20 provides the inverter switching control signals 22 in order to control position and/or speed and/or torque of the motor 6 without directly sensing any of these controlled parameters.

In the illustrated implementation, for instance, current sensors 27 are provided at the output of the inverter 14 to provide feedback signals or values 28 to the controller 20 which represent the inverter output currents IA, IB and IC, and/or from which the values of these output currents can be computed, derived or otherwise estimated. Any suitable current sensing devices 27 can be used to generate the signals and/or values 28, and may provide analog signals 28 and/or the sensors 27 may be smart sensors providing digital values 28 representing the output currents IA, IB and IC provided by the inverter 14.

The controller 20 uses the feedback signals or values 28 as well as one or more desired operating parameters 21 to perform regulation of the output currents IA, IB and IC in a localized closed-loop fashion. Overall, however, the control technique implemented by the controller 20 is essentially sensorless or open-loop with respect to the actual operating condition of the driven motor load 6, as there are no direct feedback signals obtained from the motor 6 itself. In the example of FIG. 1, for instance, the controller 20 receives a desired frequency or motor speed value f* 21 from a supervisory control system component (not shown), which may be a distributed control system element, a user-adjustable knob, local user interface, etc. The controller 20, moreover, includes a current-frequency control component 24 as well as a reduced bandwidth proportional-integral (PI) controller 26 as described further below. In operation, the control components 24 and 26 are used to regulate the inverter output currents IA, IB and IC via generation of the inverter switching control signals 22 according to the desired speed or frequency signal or value 21 and the feedback signals or values 28.

Figure 2:
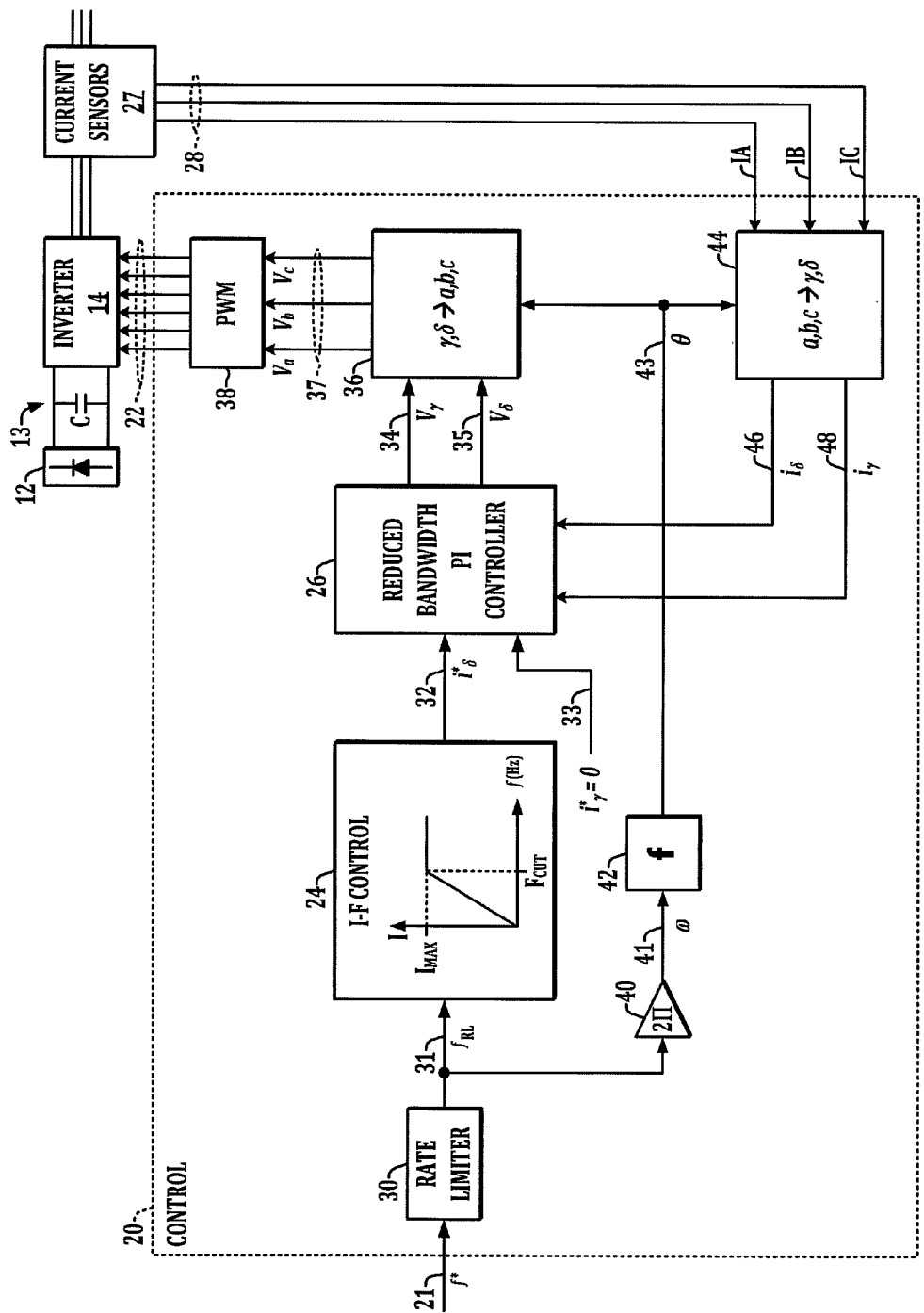
FIG. 2 is a schematic diagram illustrating further details of the exemplary inverter controller in the system of FIG. 1, including a rate limiter component, a current-frequency control component, and a reduced bandwidth PI control component in accordance with the disclosure.

Referring also to FIG. 2, one embodiment of the controller 20 is illustrated, which may optionally include a rate limiter 30, as well as the current-frequency (I-F) control component 24 and the PI controller element 26 in a forward control loop path. If included, the rate limiter component 30 receives the desired frequency or speed value 21 and limits the rate of change thereof to provide a frequency or speed setpoint value 31 as an input to the current-frequency control component 24. Other embodiments are possible in which the rate limiter 30 is omitted, with the current-frequency component 24 directly receiving the desired frequency or speed signal 21 as a setpoint input. In the illustrated implementation, the output signal or value from the rate limiter 30 is a rate-limited frequency or speed setpoint signal or value 31 (e.g., $f_{RL}$), and the rate limiter component 30 can be any suitable hardware, processor-executed software, processor-executed firmware, programmable logic, analog circuitry, etc. which limits the rate of change of the received desired speed or frequency signal 21.

In one possible implementation, for instance, the rate limiter 30 limits the rate of change of the speed signal 21 such that the output signal 31 is at a frequency which changes no faster than the maximum acceleration capability of the motor 6. In operation, a step change in the received signal 21 will be changed to a ramp signal 31, and thus the rate limiter 30 prevents the subsequent current-frequency control component 24 from demanding an immediate change to high frequency current. Particularly when used with an output sine wave filter 16 and/or a transformer 18, an immediate change to high frequency current output may not cause the motor load 6 to rotate. Use of the rate limiter 30 in certain embodiments advantageously limits the rate of change of the frequency setpoint down to the value where the motor load 6 can accelerate at the desired rate.

The rate limited frequency or speed setpoint value 31 is provided as an input to the current-frequency control component 24 as well as to an integration system 40, 42 as described further below. The current-frequency (I-F) control component 24 receives the rate-limited frequency or speed setpoint 31, and generates a δ axis current setpoint ($i^*_\delta$) 32 accordingly. As depicted in FIG. 2, the controller 20 implements various components, for example, in processor-executed software or firmware, and operates on certain variables in a synchronous δ, γ reference frame, with received feedback signals or values 28 and generated switching control signals 22 being reference to a stationary (e.g., a, b, c) reference frame. In this regard, the illustrated δ, γ reference frame rotates at the same frequency as the conventional field commutation control (D, Q) reference frame, but the position need not be the same, with γ and δ somewhat analogous to "d" and "q", but they are not necessarily aligned (e.g., γ will likely be somewhere between the D axis and the Q axis, and γ and δ are orthogonal to one another). It is also understood that current regulation can be performed in other reference frames.

As seen in FIG. 2, the current-frequency control component 24 provides a current setpoint output 32 based on the received (e.g., rate-limited) frequency or speed setpoint signal or value 31. In one possible implementation, the current-frequency control component 24 implements a dual-range curve or function as illustrated, with the current-frequency relationship being a zero current value corresponding to a zero frequency value (e.g., 0 Hz). As shown in FIG. 2, the current-frequency relationship implemented by the control component 24 includes a first portion with increasing current values corresponding to a first frequency range from the zero frequency value to a cutoff frequency value $F_{CUT}$, as well as a second portion with a constant current value (e.g., $I_{MAX}$) corresponding to frequencies above the cutoff frequency $F_{CUT}$, where $I_{MAX}$ can be the maximum rated output current of the inverter 14 in certain implementations, and the cutoff frequency $F_{CUT}$ is preferably set to correspond to a very low operating frequency of the motor 6 (e.g., about 0.5-1.0 Hz in one implementation). The current-frequency control component 24 in certain embodiments can be implemented using a lookup table or a parametric function. In this regard, the current-frequency relationship advantageously avoids providing current to the transformer 18 and the motor 6 at zero frequency, and includes the first ramped portion until the cutoff frequency, after which the maximum current is demanded, whereby the control component 24 avoids sending DC to the transformer 18. The I-F control component 24 thus avoids sending DC to the transformer 18, and the motor load 6 is typically operated at the maximum current $I_{MAX}$, whereby the operation of the motor drive 10 is very different from the conventional voltage-frequency approach of prior sensorless drives.

The output ($i^*_\delta$) of the current-frequency controller 24 is the δ axis current setpoint 32, which is provided to the PI control component 26. PI control is not a strict requirement of all embodiments of the present disclosure, wherein any suitable current regulating algorithm can be used to regulate the inverter output currents IA, IB and IC at an algorithm bandwidth that is less than the resonant frequency of the sine wave filter 16. In the illustrated embodiment, the PI controller 26 operates according to a zero γ axis value 33 ($i^*_\gamma$=0), although not a strict requirement of all implementations of the present disclosure. The PI controller 26 can be any suitable implementation of well-known proportional-integral control algorithms, but the control algorithm is bandwidth limited. Also, the control component 26 can be a PID controller with the corresponding derivative gain (KD) set to zero. The inventors have appreciated that limiting the bandwidth of the PI controller 26 avoids or mitigates large inrush current during power up, particularly where the drive 10 is providing output currents through a sine wave filter 16 and/or transformer 18. In certain applications, for instance, the sine wave filter 16 makes the inverter output particularly susceptible to large inrush currents, and limiting the bandwidth of the PI controller 26 (or other current regulation control algorithm implemented by the controller 20) to be well below the sine wave filter resonant frequency helps to mitigate or avoid high inrush current levels, particularly at power up.

The reduced bandwidth PI controller 26 also receives feedback from the output of the inverter 14 from on-board output current sensors 27. The illustrated controller 20 includes a stationary-to-synchronous reference frame converter component 44 (a,b,c→δ,γ) which provides δ and γ current feedback values 46 and 48 ($i_\delta$ and $i_\gamma$), converted from the sensed inverter output phase currents IA, IB and IC as inputs to the PI controller 26. The converter 44, moreover, performs the reference frame conversion according to a phase angle signal or value θ 43, which is computed in the illustrated embodiment based on the rate limited frequency or speed setpoint signal or value 31 as the integral of the frequency ω ($2\Pi^*f_{RL}$) via a multiplier component 40 generating the frequency signal ω 41 and an integrator component 42 providing the phase angle signal or value θ 43. The PI controller 26, moreover, provides δ and γ axis voltage setpoint signal or value outputs $V_\delta$ and $V_\gamma$ 35 and 34, respectively, which are converted to the stationary reference frame by converter 36 (δ,γ→a,b,c) using the phase angle signal or value θ 43. The reference frame converter 36, in turn, provides a set of three stationary reference frame voltage setpoint signals or values 37 ($V_a$, $V_b$ and $V_c$) as inputs to a pulse width modulation (PWM) component 38 that includes any suitable form of modulation, isolation, amplifiers, driver circuitry, etc. to generate the inverter switching control signals 22 using known techniques.

In certain embodiments, the bandwidth of the PI or other regulation control algorithm implemented in the control component 26 is well below the resonant frequency of the associated sine wave filter 16. In this regard, conventional servo and/or motor drive control algorithms regulate current using a relatively high bandwidth, such as on the order of 1 kHz. However, as mentioned above, such high control algorithm bandwidth may lead to instability or inability to properly control the output currents provided to the motor load 6, and/or lead to undesirable saturation of the transformer 18 and excessive inrush current problems. In accordance with the present disclosure, the bandwidth of the PI controller 26 is preferably one or more orders of magnitude lower than the resonant frequency of the sine wave filter 16. For example, the PI controller bandwidth 26 may be on the order of about 20 Hz or 30 Hz for use in association with sine wave filters 16 having a resonant frequency of about 2 kHz to 6 kHz. This can be implemented, for example, by limiting the proportional and integral gains (e.g., KP and KI) used in the regulation algorithm of the PI controller 26. The output of the PI controller 26 in this regard may be implemented as the summation of the error between the current setpoint values 32 and 33 and the corresponding feedback values 46 and 48, multiplied by the proportional constant KP added to the integral of the error multiplied by the integral constant KI. Thus in specific embodiments, the current loop regulation bandwidth is significantly below the resonant range of the filter 16, and this can be implemented by suitable caps or limits on the KI and the KP values used in the PI algorithm 26 such that the resonant point of the entire closed loop is less than about 20 or 30 Hz in certain implementations. Thus, the current regulation algorithm implemented by the controller 20 will not attempt to regulate current above about 30 Hz. The output 34, 35 of the PI controller 26 is the synchronous reference frame voltage values 34 and 35, which are then translated into the three-phase stationary reference frame values 37 that are used for pulse width modulating the inverter switches S1-S6.

Figure 3:
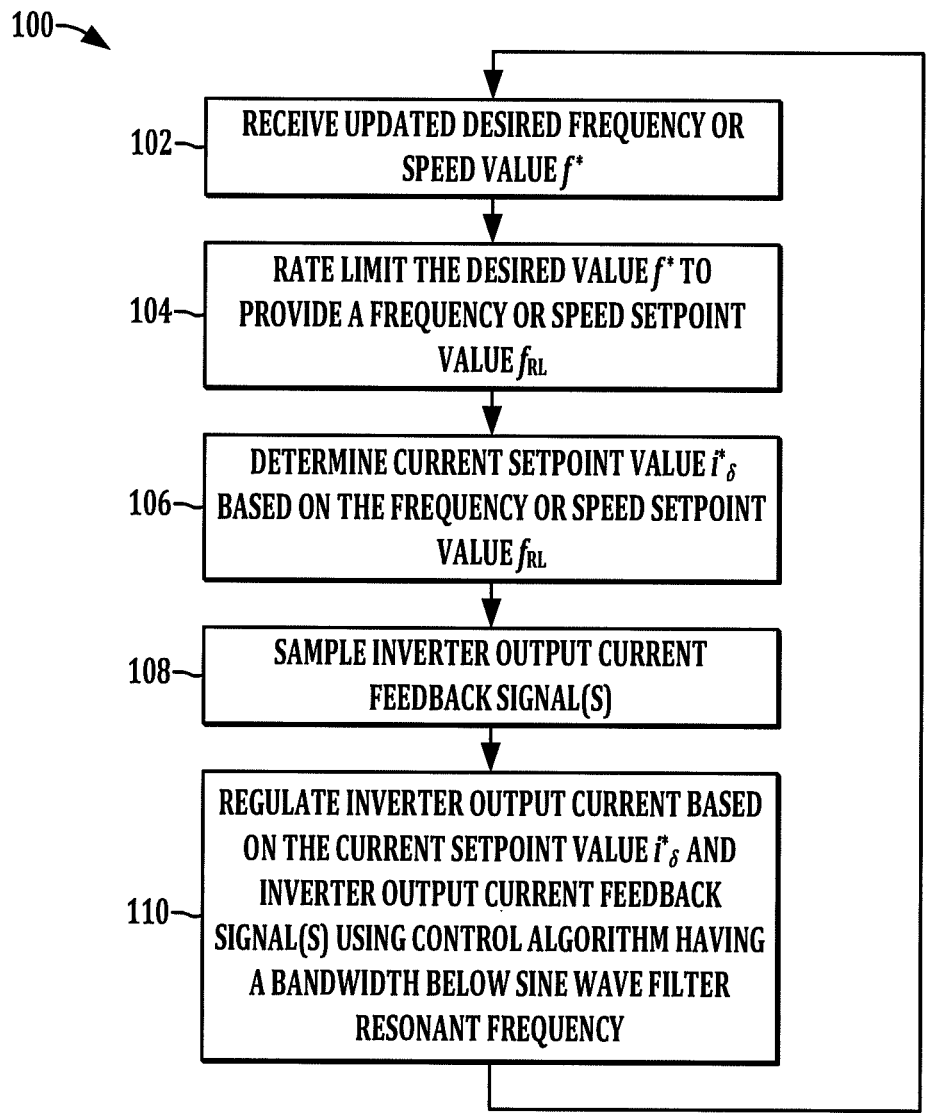
FIG. 3 is a flow diagram illustrating an exemplary method for controlling a power conversion system driving a load through a filter in accordance with further aspects of the present disclosure.

Referring also to FIG. 3, a flow diagram is provided illustrating a method 100 for controlling a power conversion system (e.g., the motor drive 10 above) to drive a load (e.g., motor 6) through a filter (e.g., sine wave filter 16). Although the exemplary method 100 is depicted and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, or combinations thereof, in order to provide sensorless motor control using bandwidth limited control algorithms as described herein, and various embodiments or implementations include non-transitory computer readable mediums having computer-executable instructions performing the illustrated and described methods. For instance, the method 100 may be implemented using one or more processors associated with the controller 20, by executing instructions stored in an electronic memory operatively associated with the controller 20.

The process 100 begins at 102 where an updated desired frequency or speed value is received (e.g., signal or value f* 21 in FIGS. 1 and 2 above). At 104, the desired value f* may optionally be rate limited to provide a rate limited frequency or speed setpoint value (e.g., $f_{RL}$ 31 in FIG. 2). At 106 in FIG. 3, a current setpoint value is determined (□□ axis current setpoint $i^*_\delta$ 32 in FIG. 2) at least partially according to the frequency or speed setpoint value 21, 31. At 108, one or more AC output current feedback signals or values of the power converter are sampled (e.g., IA, IB and IC sampled using sensors 27 in FIG. 1 above). At 110, the AC output current(s) is/are regulated according to the current setpoint value 32 and the feedback signal(s) or value(s) 28 using a control algorithm having a bandwidth below the resonant frequency of the filter 16. For instance, the AC output currents are regulated in the above described motor drive 10 using a proportional-integral control algorithm (e.g., via PI controller 26) having a bandwidth that is less than the resonant frequency of the sine wave filter 16. The process 100 in FIG. 3 then returns to receive another updated desired frequency or speed value 21 at 102 and continues as described above.

The above techniques and apparatus thus advantageously facilitate sensorless control of induction or permanent magnet motor loads 6 in applications such as those described supra in which sine wave filters 16 and/or transformers 18 are provided to accommodate long cable lengths 8 without the shortcomings associated with conventional voltage-frequency control schemes. In addition, the disclosed concepts can be employed without any additional hardware, and may be implemented largely in processor-executed software of a motor drive controller 20. These techniques, moreover, may be employed to reduce or avoid filter inrush current, transformer saturation, and uncontrolled motor drive output current oscillation associated with conventional approaches, while avoiding extra cost and/or system complexity associated with provision of sensors at the load 6. In addition, the techniques also allow the system design flexibility of employing transformers 18 to accommodate long cable runs while reducing or avoiding I²R losses and allowing the use of smaller cabling 8, thereby providing viable solutions to submersible pump applications and other installations where the transformer 18 can accommodate use of low-voltage motor drives 10 for medium or higher voltage motors 6, including permanent magnet motors.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
an inverter operative to provide AC output power to drive a load; and
a controller operative to regulate at least one inverter output current according to a frequency or speed setpoint value via a control algorithm having a current-frequency relationship with a zero current value corresponding to a zero frequency value, and a bandwidth below a resonant frequency of a filter coupled between the inverter and the load.

2. The power conversion system of claim 1, wherein the controller comprises:
a current-frequency control component providing a current setpoint value according to the frequency or speed setpoint value and the current-frequency relationship with the zero current value corresponding to the zero frequency value; and
a current control regulator component implementing the control algorithm to regulate the inverter output current according to the current setpoint value.

3. The power conversion system of claim 2, wherein the current control regulator component implements the control algorithm to regulate the inverter output currents according to the current setpoint value and at least one feedback signal or value representing the inverter output current.

4. The power conversion system of claim 3, wherein the controller comprises a rate limiter component limiting a rate of change of a received desired frequency or speed value to provide the frequency or speed setpoint value.

5. The power conversion system of claim 2, wherein the controller comprises a rate limiter component limiting a rate of change of a received desired frequency or speed value to provide the frequency or speed setpoint value.

6. The power conversion system of claim 2, wherein the controller includes a proportional-integral controller to regulate the inverter output currents, the proportional-integral controller having a bandwidth below the resonant frequency of the filter coupled between the inverter and the load.

7. The power conversion system of claim 6, wherein the controller regulates the inverter output current according to a current setpoint value derived from the frequency or speed setpoint value and according to at least one feedback signal or value representing the inverter output current.

8. The power conversion system of claim 6, wherein the controller comprises a rate limiter component limiting a rate of change of a received desired frequency or speed value to provide the frequency or speed setpoint value.

9. The power conversion system of claim 2, wherein the current control regulator component is a proportional-integral controller having a bandwidth below the resonant frequency of the filter coupled between the inverter and the load.

10. The power conversion system of claim 9, wherein the controller comprises a rate limiter component limiting a rate of change of a received desired frequency or speed value to provide the frequency or speed setpoint value.

11. The power conversion system of claim 9, wherein the current control regulator component implements the control algorithm to regulate the inverter output current according to the current setpoint value and at least one feedback signal or value representing the inverter output current.

12. The power conversion system of claim 11, wherein the controller comprises a rate limiter component limiting a rate of change of a received desired frequency or speed value to provide the frequency or speed setpoint value.

13. The power conversion system of claim 1, wherein the controller regulates the inverter output current according to a current setpoint value derived from the frequency or speed setpoint value and according to at least one feedback signal or value representing the inverter output currents.

14. The power conversion system of claim 1, wherein the controller comprises a rate limiter component limiting a rate of change of a received desired frequency or speed value to provide the frequency or speed setpoint value.

15. A method for controlling a power conversion system driving a load through a filter, the method comprising:
determining a current setpoint value according to a frequency or speed setpoint value;
sampling at least one AC output current feedback signal or value of the power conversion system; and
regulating the at least one AC output current according to the current setpoint value and the at least one AC output current feedback signal or value using a control algorithm having a current-frequency relationship with a zero current value corresponding to a zero frequency value, and a bandwidth below a resonant frequency of the filter.

16. The method of claim 15, comprising limiting a rate of change of a desired frequency or speed value to determine the frequency or speed setpoint value.

17. The method of claim 15, wherein the current setpoint value is determined according to a current-frequency relationship with a zero current value corresponding to a zero frequency value.

18. The method of claim 17, wherein the current-frequency relationship includes a first portion with increasing current values corresponding to a first frequency range from the zero frequency value to a cutoff frequency value, and a second portion with a constant current value ($I_{MAX}$) corresponding to frequencies higher than the cutoff frequency value.

19. The method of claim 15, wherein the at least one AC output current is regulated using a proportional-integral control algorithm having a bandwidth below the resonant frequency of the filter.

20. A non-transitory computer readable medium with computer executable instructions for controlling a power conversion system driving a load through a filter, the computer readable medium comprising computer executable instructions for causing a processor when executed to:
- determine a current setpoint value according to a frequency or speed setpoint value;
- sample at least one AC output current feedback signal or value of the power conversion system; and
- regulate the at least one AC output current according to the current setpoint value and the at least one AC output current feedback signal or value using a control algorithm having a current-frequency relationship with a zero current value corresponding to a zero frequency value, and a bandwidth below a resonant frequency of the filter.

* * * * *